(No Model.)
6 Sheets—Sheet 2.
G. H. WALDO.
GRADING MACHINE.
No. 278,296.  Patented May 22, 1883.
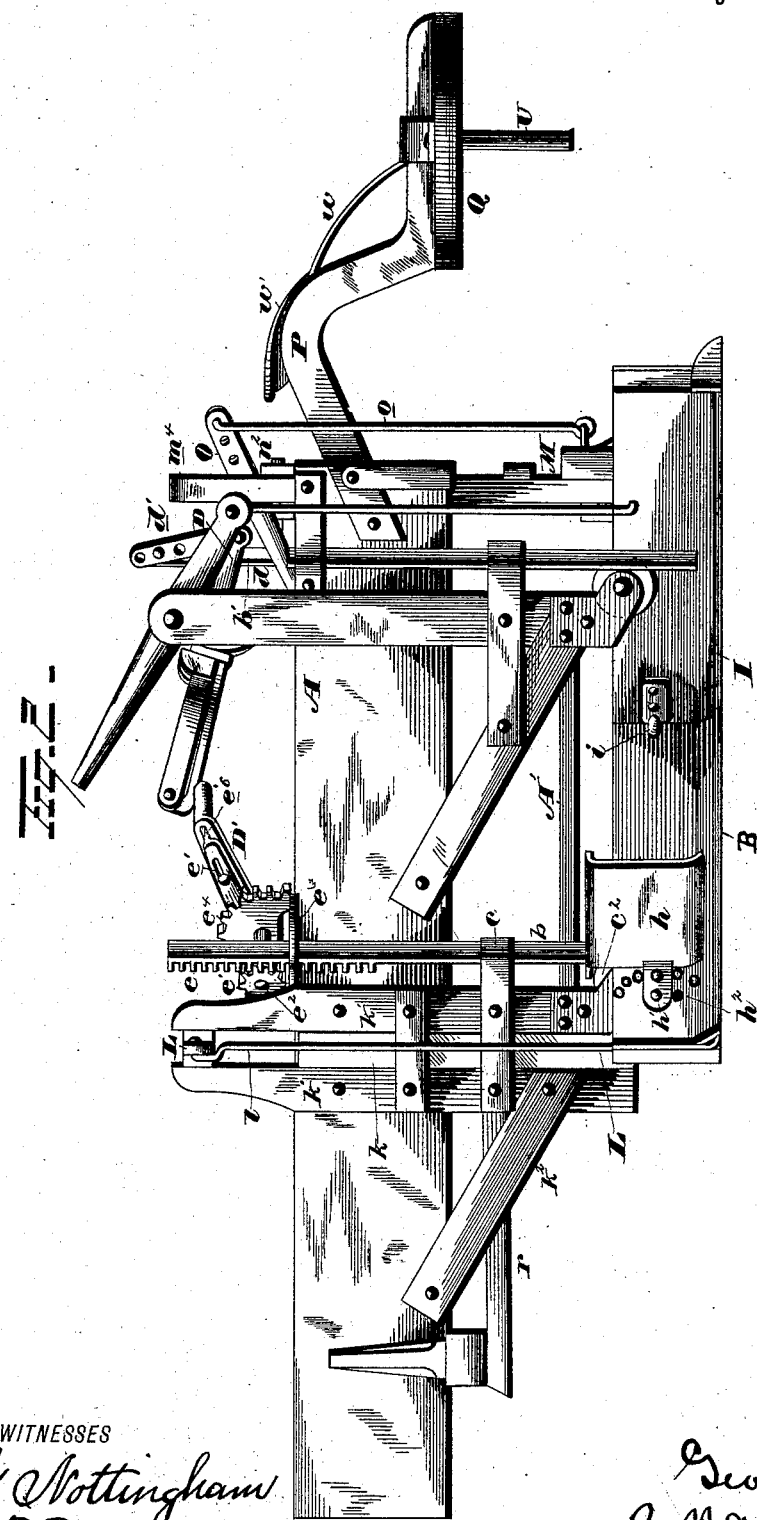
WITNESSES
S. G. Nottingham
G. F. Downing
INVENTOR
Geo. H. Waldo
By H. A. Simpson
Attorney (No Model.) 6 Sheets—Sheet 3.
G. H. WALDO.
GRADING MACHINE.
No. 278,296. Patented May 22, 1883.
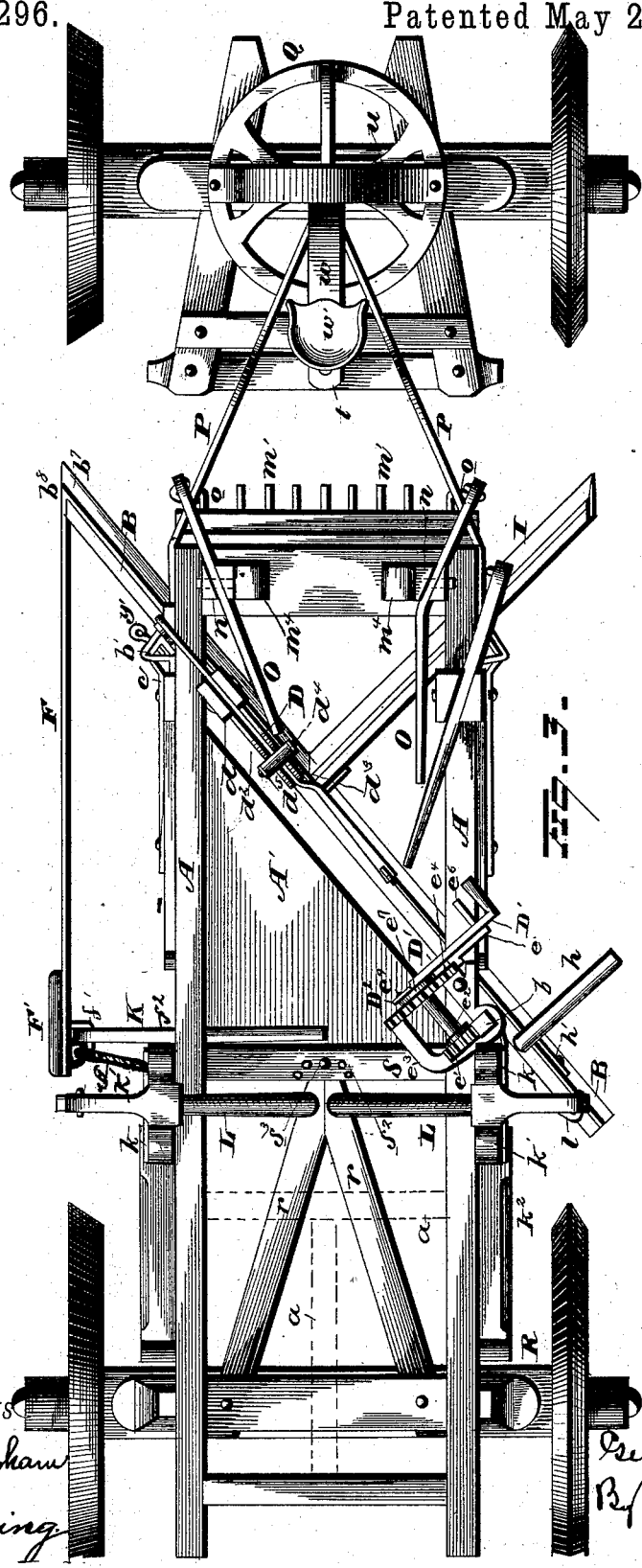
WITNESSES
S. G. Nottingham
G. F. Downing
INVENTOR
Geo. H. Waldo.
By H. A. Seymour.
Attorney

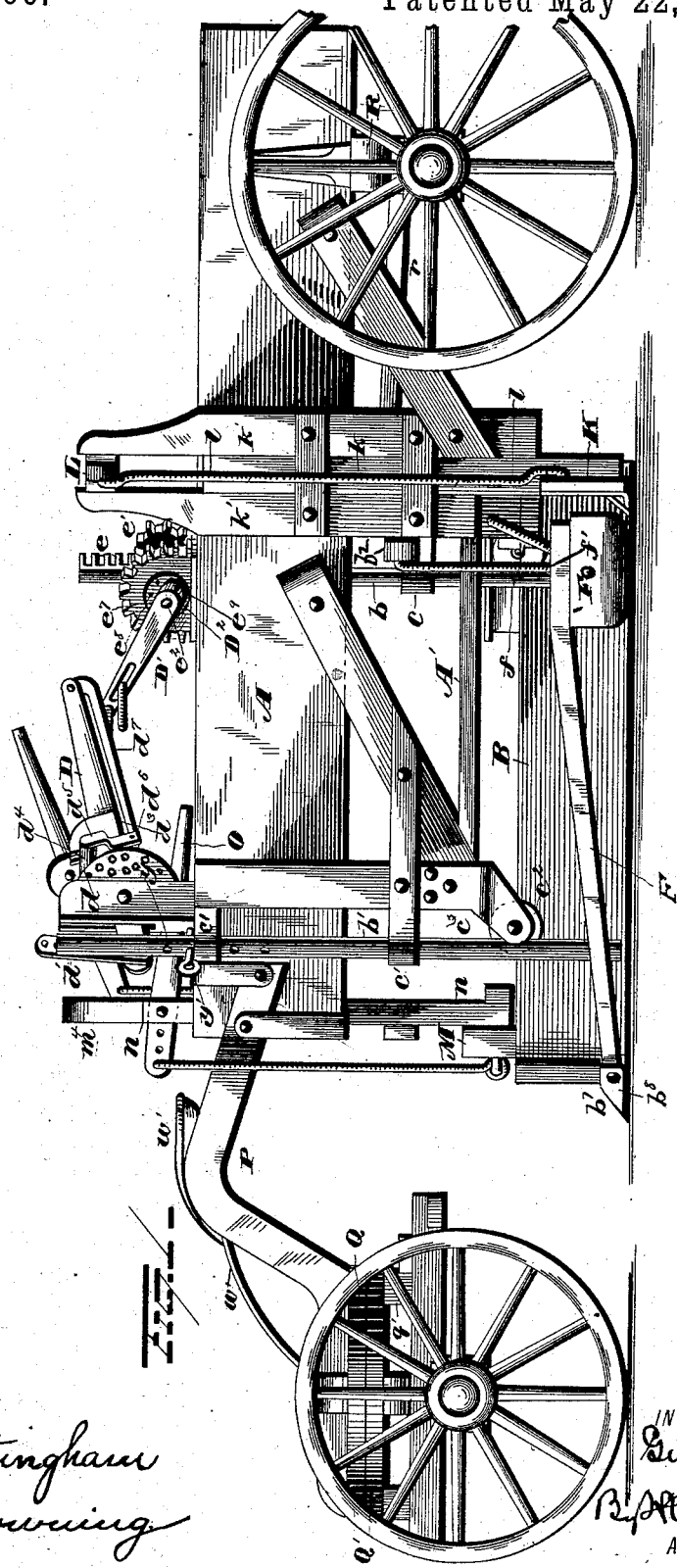

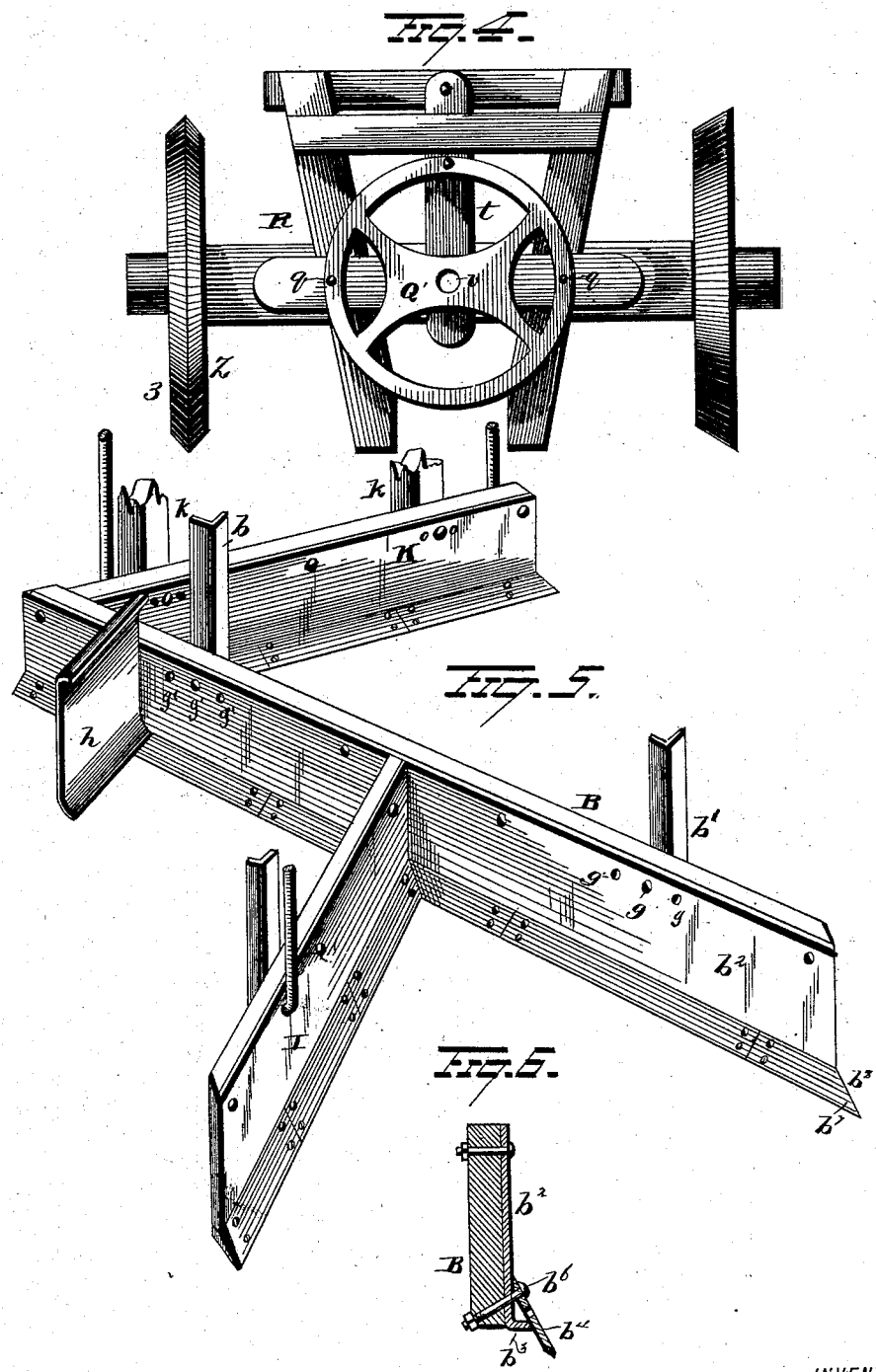

(No Model.)  6 Sheets—Sheet 5.
G. H. WALDO.
GRADING MACHINE.
No. 278,296  Patented May 22, 1883.
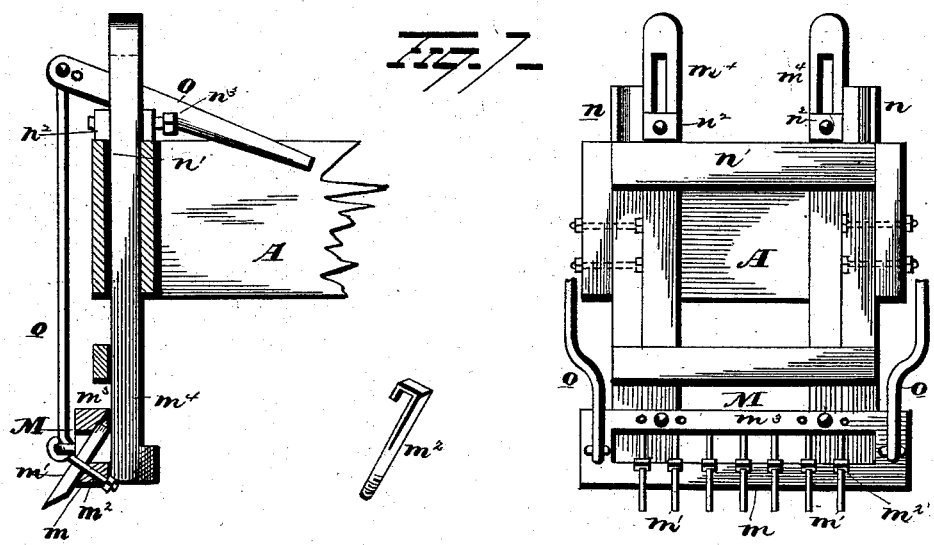
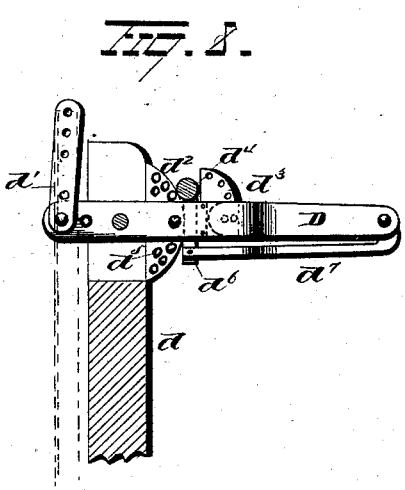
WITNESSES  
S. G. Nottingham  
G. F. Downing  
INVENTOR  
Geo. H. Waldo  
By H. A. Sumnom  
Attorney

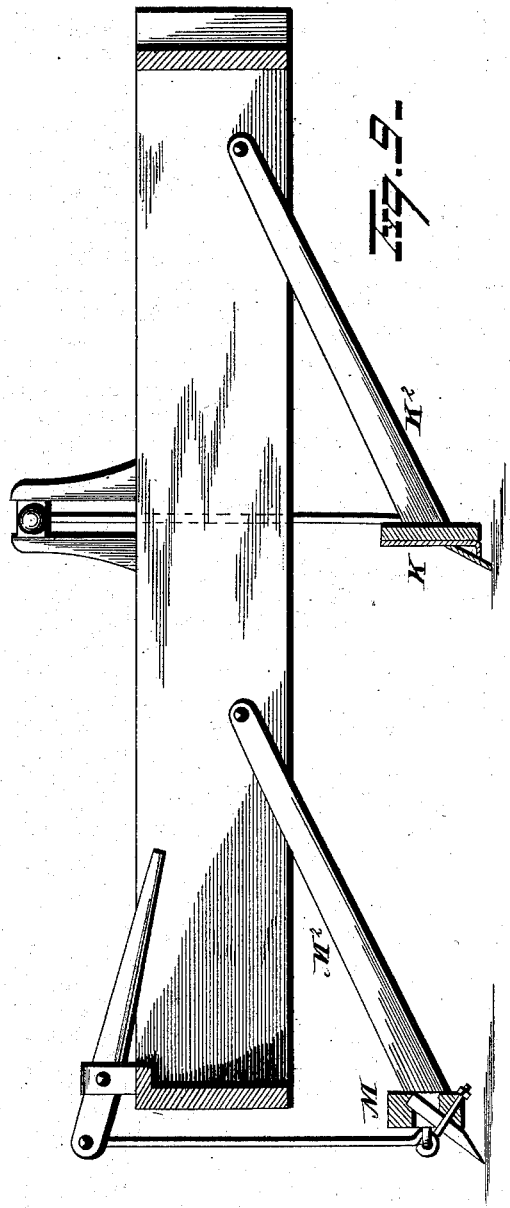

UNITED STATES PATENT OFFICE.

GEORGE H. WALDO, OF DETROIT, MICHIGAN.

GRADING-MACHINE.

SPECIFICATION forming part of Letters Patent No. 278,296, dated May 22, 1883.

Application filed October 2, 1882. (No model.)

*To all whom it may concern:*

Be it known that I, GEORGE H. WALDO, of Detroit, in the county of Wayne and State of Michigan, have invented certain new and useful Improvements in Grading-Machines; and I do hereby declare the following to be a full, clear, and exact description of the invention, such as will enable others skilled in the art to which it pertains to make and use the same.

This invention relates to an improvement in that class of earth-grading machines in which one or more scrapers are carried by a frame mounted on wheels. Its main object is to increase the rapidity and accuracy with which earth surfaces may be graded or cut away and thrown up into a road-bed or other desired positions; and it has the further object to provide a machine of this class which may be readily connected with and removed from the running-gear of an ordinary farm-wagon, thus giving increased utility to the latter and reducing the expense of the machine.

I do not wish to confine myself to the use of a farm-wagon exclusively, but prefer it for the reasons stated.

In accomplishing the object in view the invention consists in certain novel constructions and combinations of devices, which will be hereinafter particularly described, and pointed out in the claims.

In the accompanying drawings, Figure 1 is a view of a grading-machine constructed according to my invention and mounted on the running-gear of an ordinary farm-wagon. Fig. 2 is a side elevation of the machine detached from the running-gear, this view being on the opposite side from that shown in Fig. 1. Fig. 3 is a plan view of the machine mounted on the running-gear. Fig. 4 is a detached view of the front running-gear of a farm-wagon adapted for connection with the machine, and the wheels are provided with auxiliary tires of special construction. Fig. 5 is a perspective view of the oblique scraper detached. Fig. 6 is a cross-section of the same through one of the cutter-blades. Fig. 7 represents a front view and cross-section of a scarifier, taken close by the side of one of the spades. Fig. 8 is a detached perspective view of the lifting-rods, lever, clutch, and guides. Fig. 9 is a longitudinal section of the main frame, showing a modification of the devices which may support the scarifier or either of the scrapers, and those supports may be hinged or jointed at both ends, if desired.

The letter A designates the main frame, which supports the operative parts of the machine. It is similar in shape to the body or box of a farm-wagon, but is made of heavier timber or material, and has the main portion of its bottom preferably left open, an operator's platform, A', being arranged under the frame and connected therewith. Obliquely under the frame, and projecting outwardly beyond each side thereof, is arranged the main-scraper bar B, in such position that it stands between the front and rear wheels when the machine is mounted on the running-gears. This scraper may be of any desired length, and it is also made adjustable endwise, and may be set so its ends extend beyond the carrying-wheels on both sides, or on either one and not the other; or it may be adjusted so that either end will stand within the line or track of either the front or rear running-gear, and, if desired, the plowing-point can be brought in direct line with the line of draft for plowing hard and refractory earth or making surface ditches, where plowing and scraping at the same time, or separately, with the plowing-point inside and between the lines of the track of its carrying-wheels, may be desirable. This will be more fully explained hereinafter. These changes may be accomplished by changing the pivotal pins which pass through the scraper-bar and connect it to the lifting devices or angle-irons, and inserting them in similar holes nearer to or farther from the front end of said scraper-bar, and the same or similar adjustments are made in both the scarifier and transverse scraper, and in a similar manner. It will readily be seen that these adjustments secure the scrapers or scarifier rigidly in their line of adjustments with respect to the main body of the machine. I do not confine myself to these particular devices for this adjustment, but may use any other suitable means for this purpose. This scraper-bar is connected pivotally to the lower ends of lifting-rods $b\ b'$, arranged to slide vertically in guides $c\ c'$, secured to the frame-work, and in contact with anti-friction wheels $c^2$, mounted on hangers $c^3$, depending rigidly from the main frame. These lifting-rods are operated by levers D' and D, respectively fulcrumed on supports attached to the main frame. The rods $b$ $b'$ may be used to support the scraper-blade in its vertical and upright position in guides $c$ $c'$, and similar rods or devices may support the scarifier and transverse scraper-bar, and the anti-friction wheels, coming in contact with these rods or other supports, resist the forces tending to deflect the scraper out of its proper position, and act as both anti-friction guides and supports as well as adjusting-rods; or other supporting devices may be used to connect the lifting-levers with the scraper-bars or scarifier, similar to those shown in Fig. 7, that are attached to the scarifier and lifting-lever, while said supporting devices are operated in connection with the said anti-friction devices and form part of the same. In either case the scrapers may be attached to said rods or other supports in such a manner as to admit of their being adjusted endwise of said scraper-bar. These or similar anti-friction devices may be equally well applied in the same or a similar manner to the scarifier or other scraper blades.

I do not wish to confine myself to the special construction of the anti-friction devices shown; but any suitable anti-friction devices may be used in their place that will perform all of the functions set forth in these.

The forward lever, D, is pivoted between the forks of a bifurcated standard, $d$, or other suitable supports, and has its short arm provided with a series of holes, for the purpose of changing the relative length of the short and long arms to said lever, the ease of adjusting and operating, and the vertical distance of adjustment or stroke of the parts being acted upon to which they may be attached, according to the work and desire of the operator. A similar adjustment may be made between said lever and adjusting devices by use of the various holes, as shown in Fig. 8, and thus place said levers in a convenient position to operate. Said short arm is pivoted to a link, $d'$, and said link is in turn pivoted to a lifting-rod, $b$. The lever is provided with a friction-clutch device to hold it in any position to which it may be adjusted. The clutch is constructed as follows, (see Fig. 8:) Two segments, $d^2$ $d^2$, project from the standard $d$ on opposite sides of the lever, which, at a little distance beyond the edge of the segments, is provided with two upwardly-projecting lugs, $d^3$ $d^3$, rigidly secured to its opposite sides, and having their edges next the segments inclined outwardly therefrom. Between these outwardly-inclined edges of the lugs and the edges of the segments is arranged a roller, $d^4$, which may be of any desired length or diameter, and the inner faces of the lugs and outer faces of the segments should nearly correspond in width to the length of the face of said roller, and the relative distance between the faces of said lugs and segments should be more than the diameter of said roller on one side and less on the other of its point of contact with said faces. The projecting ends of the roller may be pivoted between the arms of a bifurcated jacket, $d^5$, an arm, $d^6$, of which extends below the lever, and is pivoted to one end of a rod, $d^7$, arranged under the lever, and having its other and bent end pivoted to the long arm thereof at a point outwardly beyond the lugs; or any suitable device may be employed to operate said roller and lock and unlock the same. The roller, when left free, will rest against the edges of the lugs and segments and be supported out of contact with the lever, and when raised it will be carried out of contact with the lugs or segments, resting against one or the other, according to the position of the lever.

In order to operate the lever for raising the lifting-rod and scraper, the operator simply bears down upon the long arm, and on releasing it the weight attached to the short arm, having a tendency to lift the long arm, will cause the roller $d^4$ to be wedged in between the inclined lugs and the edges of the segments, thus acting as a stop to the raising of the long arm, on the principle of a toggle-joint. Now, in order to raise the long arm for lowering the scraper, the operator grasps it and the rod $d^7$ in one hand at the same time, thus drawing the rod up to the lever and raising the roller $d^4$, so that it will be no longer in position to be jammed between the lugs and segments, and the long arm of the lever will be then free to be raised to any desired position, and will be then held from further rising when the roller is allowed to fall. Instead of falling by gravity, the roller may be forced in between the segments and lugs by a spring or other device, with which construction the clutch may be used either side up to hold the scraper respectively either up or down. The advantage of this clutch is that it enables a very exact adjustment of the scraper to be made, while it allows the long end of the lever to be pressed down and elevate instantly the operative parts of the machine that may be connected with said lever upon coming suddenly upon any obstruction, and without waiting to unlock any clutch. It also allows the operative parts connected thereto to rise and pass over a rock or other substance which it cannot penetrate when it is not locked down rigidly, which may be done when desired, while the usual ratchet-and-pawl movement must always correspond to the space of at least one tooth, which is often too much or too little. The lifting-rods $b$ $b'$ are made of angle-iron, with the concavity turned rearwardly, and the anti-friction wheels $c^2$ have their peripheries fitting in this concavity, and thereby prevent the deflection of the rods and endwise or sidewise play of the scraper-bar, and such concavity forms a smooth, even track for said wheels to travel in, and allows the scraper-bar free play vertically without forcing it out of its vertical plane in adjusting the same. I do not wish to confine myself to this specified construction, but wish to cover, broadly, this or other anti-friction devices that will receive the resisting force of said scraper-bar, or other vertically-adjustable parts shown, when operated in connection with such devices, to relieve the friction of adjusting such scraper or other adjustable operative parts, substantially as these devices that are shown and described.

The guides $c$ and $c'$ are bent in front of the rods, as shown, and embrace the outer surface of these angle-iron rods or other supports closely on the opposite side from said rollers, and thus prevent the vibration of the scraper-bar and hold it rigid with respect to the main frame in all respects except its free vertical adjustment. They thus enable the operator to make a smooth, clean, straight cut at either end of the scraper-bar or its entire length, and carry it ahead into its work as steady as a common plow, which could not be the case if the scraper-bar were allowed to vibrate or play loosely in its vertical adjustment. The upper portion of the forward lifting-rod is perforated with a series of holes, $y$, into either of which a pin, $y'$, may be inserted above the guide $c'$, to hold the rod and scraper firmly at any desired elevation while the parts at either end are being fitted thereto, and the lever adjusted in convenient position to be operated upon, or the leverage changed by changing the operative length of the short arm of said lever; also, in transporting the machine, to relieve the clutch and throw the weight of the operative parts off of said clutch and onto the main carrying-frame; or the pin may be inserted under the guide to prevent the upward movement of the rod and scraper-bars or scarifier, to which it may be operatively connected, when the nature of the earth being treated is hard and refractory; or this pin or other suitable devices may be inserted in the segments $d^2$ $d^2$ by providing them with a suitable series of holes between their centers and circumference and a corresponding hole in lever D; or the said pin may be inserted under said lever through the said segments and accomplish the same result. Any other suitable means for rigidly locking the scarifier and scrapers may be employed to accomplish the same result. Said locking devices and friction-clutch devices may also be employed for operating the scarifier or either scraper, and locking either or both ends, as desired. The rear lifting-rod, $b$, may be perforated in a similar manner for the same purpose, and the same or similar devices may be used for a similar purpose in adjusting and locking any of the operative adjustable parts of said machine.

I provide one of the inner surfaces of the lifting-rods $b$ with rack-teeth $e$, which engage with a pinion, $e'$, fixed upon the short shaft $e^2$, journaled in a bracket, $e^3$, fixed upon the main frame, and provided with segment $e^4$, concentric with the shaft, and near the end thereof opposite from the pinion. To the end of the shaft which projects beyond this segment is secured the crank-lever D', which is provided on its surface next the segment with a sliding dog, $e^5$, adapted to engage with the teeth of the segment, and having a handle, $e^6$, extending through a slot in the lever and standing under the crank-handle. I do not wish to confine myself to this specified construction, but the parts may be applied in any other suitable manner; or the lever D and friction-clutch device may be attached to the pinion, or a section thereof, and employed to mesh into the rack for elevating and locking the scraper-bars or scarifier in any desired position. On grasping the crank-handle and the handle of the dog in the hand at the same time, the latter is raised and the dog disengaged from the teeth of the segment, so that the operator may move the crank-lever to raise or lower the rear end of the scraper through the rack and pinion and lifting-rod $b$, which is pivoted to said scraper-bar. When the crank-lever is released, the dog will fall into an engagement with the segment and prevent further movement.

Between the crank-lever D' and the segment a collar, $e^7$, is rigidly secured to the shaft, and provided with a concentric row of holes, $e^8$. The end of the crank-lever attached to or supported by said shaft extends beyond the shaft, and has a hole formed through it to coincide with the row of holes $e^8$ in the collar. A pin, $e^9$, passed through the holes in the lever and one of the holes in the collar, holds the lever in position, and by changing the pin to any particular hole in the collar the lever may be adjusted to have a convenient position for operation, whatever may be the position of the rack and scraper-bar. In case the lever D and rack and pinion are used together, the lever D may be jointedly secured in the lugs and a series of suitable holes formed in said lugs, and a corresponding hole in lever D, through which a pin may be inserted, and thus similarly adjust the lever D to any convenient position to be operated upon.

The main scraper B is formed of a stout oak plank, having a metallic facing, $b^2$, as shown in Fig. 6, or of other suitable material. At its lower edge it is provided with a rib, $b^3$, against which rest the cutting-blades $b^4$, said rib having a suitable projection to support the blades at a proper inclination, with their upper edges resting against the metallic facing or front surface of the scraper-bar and their lower edges projecting below the bottom of said scraper-bar for acting upon the earth and cutting it away. The cutting-blades have sharpened double cutting-edges, and are reversible edge for edge, or face for face, and also interchangeable plate for plate, and vertically adjustable on said scraper-bar. I prefer to provide each cutting-blade with two or more holes or slots in a transverse row across it for bolts, so that the blades may be adjusted and compensate for wear. These cutting-blades are detachably secured to the scraper by bolts or other suitable means. It will be seen that with blades thus provided they may be shifted to the rear, when they become worn, from the front end, or from either end, and be shifted to the center, according to their wear, and be replaced by those that are but little worn in the center of the transverse and rear end of the oblique scraper-bar, and by this means and the vertical adjustment and double-edged and reversible faces I can equalize the wear of a set of these cutting-blades and make them last much longer than a single long cutting-blade or set of blades not having these capacities for adjustment. It will be observed that when the scraper-blades are rigidly locked the cutting-blades are forced to cut away the hard earth with which they come in contact, as they cannot yield at either end, and when either of the wheels drops into a rut or depression it does not rock or tip the ends of the blade and relieve the wear on the cutting-blades in the least, owing to a construction hereinafter set forth. Again, in a machine of this character having a plow attachment to its oblique scraper-bar, which forms also a portion of the cutting or scraping edge, and in which said cutting-blades, located at the front part of said scraper-bar, are required in plowing to resist the entire wear of such plowing, except the wear on said point, it requires special provisions of this character that are of no benefit to that class of scrapers that drag over the ground and scrape the loose earth, or even to those that may be adjusted to cut into the earth, but are so arranged that they are carried over the high and into the low places and rock from side to side to conform to the surface of the earth in that respect. In such machines the wear on their scraping surface or edge must be very nearly the same the whole length of their scraper-bars. Thus will be readily seen the importance of the functions set forth in the said series of cutting-blades when attached to a machine of this kind, and having these cutting-blades secured to the scraper-bar in such a manner that their cutting-edge is unyieldingly secured thereto, and said scraper-bar is independently vertically adjustable at its ends, and provided with means for locking it rigidly in the position in which it may be adjusted to operate.

The forward end of the main oblique scraper I provide with a plow-point, $b^7$, having a landside, $b^8$, in order that a straight and neat edge may be formed at the termination of the surface adjacent to that being cut down; or, if desired, I may make the landside in a separate piece from said point and attachable to said scraper-bar. To the rear end of the landside of the plow-point I pivot one end of a guard-bar, F, which extends rearwardly, and is provided with a shoe, F', having a sharp and outwardly-inclined lower edge adapted to enter the earth. To the guard-bar F is hinged one end of a brace-rod, $f$, which extends under the frame A, and is pivoted at its other end to a stationary support. A link, $f'$, connects the rear portion of the guard-bar with a lever, $f^2$, (see Fig. 3,) which is pivoted to a support attached to the main frame, and has one arm extending inwardly in convenient position to be operated; or the supporting-frame to said shoe may be attached to any convenient part of the machine in any suitable manner, where it can be vertically adjusted independently of the scraper-bar, or forced into the earth by its adjusting devices and the weight of the machine. The office of the guard-bar and shoe is to prevent lateral swerving of the machine, owing to the lateral pressure encountered by the main scraper-bar, especially upon steep sidling work, and to relieve the strain on the carrying wheels and axles. When the shoe drags upon the ground, any tendency of the machine to swerve under the pressure on the scraper, or on account of the steepness of the earth on which it may be working, will cause the edge of the shoe to enter the earth and serve as an effectual stop to further movement of the machine in that direction. As the shoe is firmly braced by the brace or rod $f$, I prefer to attach said shoe to its supporting rods or frame at one point pivotally, so it can play up and down at its ends, and thus accommodate itself to any uneven surface that may be presented, and still have a long cutting-edge that will thus take into the ground and have firmer bearing in case the earth is of a loose nature.

The scraper B is secured to the lifting-rods $b$ and $b'$ by means of pivot-bolts $g$ $g$, or other suitable means, which permit either end of the scraper to be raised or lowered without correspondingly adjusting the other end. I form in the scraper-bar a series of longitudinal bolt-holes for each pivot-bolt, or lengthwise of said scraper slots or other suitable means may be employed in place of said holes for the same purpose, in order that the scraper-bar may be adjusted longitudinally or endwise, so as to project more or less, as desired, to either side of a center line drawn lengthwise through said machine. Similar holes or devices to adjust both the scarifier and transverse scraper are provided, whereby they may also be adjusted in the same or a similar manner. The scrapers and scarifier are all provided with means of locking or securing them rigidly in such adjustment with respect to the carrying-frame or line of draft. Near the rear end of the oblique scraper-bar B, I provide it with an adjustable stop, $h$, consisting of a metal plate projecting transversely in front of the scraper, and having an arm, $h'$, which is pivotally hinged to the scraper-bar, so that it may be turned down to the position shown in Fig. 2 to intercept the earth sliding rearwardly from the scraper. This stop may also be made of any other suitable material, and attached to the said scraper or machine in such a manner as to perform substantially the same functions. The stop may also be turned up out of the way entirely above said scraper-bar, and above its pivotally-hinged point of attachment to said machine. A vertical row of holes, $h^2$, are formed in the scraper-bar, and a hole may also be formed, if desired, through the arm $h'$, to correspond with those in the scraper-bar.

Through any of these holes may be inserted a pin, and thus hold the stop down to its work, or part way down or part way up by inserting the pin either above or below said arm; or, by inserting it through said arm and into the said holes in the scraper-bar, it can be rigidly set to said scraper at varied degrees up or down, and thus be made vertically adjustable by means of the adjustment of said scraper-bar. The stop is also so arranged and attached to and with said machine that the pressure of the earth against it tends to hold it down to place, and still, upon its striking anything hard, like a rock or other substance, it can rise and pass the obstruction when the resistance becomes severe. It is also attachable and detachable by simply removing the bolt or replacing it, as the case may be, that secures the pivotal hinged movement of said parts. It will be seen that by its various adjustments it is adapted to be set to stop more or less of the earth and carry it forward to a point in front of the machine.

I arrange in connection with the main scraper an auxiliary scraper, I, projecting at any suitable angle therefrom. This auxiliary scraper is constructed similarly to the main scraper, and the front end is provided with devices for raising and lowering, similar to those used for the same purpose on the main scraper. This scraper may also be attachable and detachable as well as vertically adjustable at its front end independently of its rear end, or of the main-scraper bar, to which it is pivotally hinged to allow of said vertical adjustment. The pin $i$ fits loosely into a hole formed in the main scraper, so as to permit the adjustment of either scraper without injuring the connection, and adjusting the main scraper, it will be seen, effects a corresponding adjustment of the rear end of the auxiliary scraper. The same or similar devices are used for adjusting its front end and for locking it as have been described in connection with the oblique scraper, and for the same purpose.

In the rear of the main oblique scraper is located a transverse additional scraper to smooth the surface, which has been more or less cut away, and it will also carry the earth ahead, while the oblique scraper throws its load to one side and beyond the reach of the transverse scraper, if desired. This transverse scraper is constructed similarly to the oblique scraper. Its opposite ends are provided with similar means to adjust them vertically and independently from each other, also from the oblique scraper, as are used in the oblique scraper's adjustment; and it can also be locked rigidly or yieldingly in the same manner, if desired. The bars $k\ k$ slide vertically between guides $k'\ k'$, secured to the main frame, the rear guides being strengthened by a brace, $k^2$. The guides $k'\ k'$ project above the top of the main frame, and between each pair is pivoted a lever, L, similar to lever D, the outer arm of which is connected with the scraper by means of rods or links $l$. Each of the levers L L is provided with suitable locking devices.

In front of the main scraper, and supported by it, is arranged a detachable transverse scarifier, M, consisting of a strong cross-bar, $m$, provided with a series of reversible interchangeable and vertically-adjustable spades or cutters, $m'$, adjustably secured to the cross-bar by hook-bolts, (see Fig. 7;) or said spades may be made vertically adjustable and interchangeable, but not reversible, if desired, and thus enable those at or near the ends to be let down as they wear, and their cutting-points in line nearly with each other. The interchangeable feature enables those most rapidly worn at or near the ends to be changed, and those in the center to be placed at the end, where they will get their proportion of wear. In this way they can be kept in position to break and loosen the earth evenly for the scraper-bar and its cutting-blades to plane off and collect and place the earth where it may be desired. These functions are equally required in the scarifier spades or cutters as in the cutting-blades of the scraper. The spades or cutters, if reversible, are sharpened at each end, but if not reversible only one end need be sharpened. A more detailed description of the scarifier and its attachments will be given. A little above the bar $m$ is a parallel bar, $m^3$, connected thereto at its ends by cross-pieces. This upper bar, $m^3$, serves to brace the spades $m'$, the upper portions of which rest against its rear edge, or they may be supported in any other suitable manner. The spades or cutters are simply short bars of suitable metal, sharpened at one or both ends to form suitable cutting-points. The hooks of the hook-bolts embrace the spades and hold them firmly to the bar $m$. This may be provided with notches or other means to hold the cutters firmly in their position. The bar $m$ is connected on either side of its center to vertical guide-bars $m^4$, which slide vertically between posts $n\ n$, secured removably to the main frame, and through guide-passages formed in a cross-bar, $n'$, also secured to the main frame. The upper portion of the guide-bars $m'$ are slotted, and in front of the slotted portions of said guide-bars are arranged stop-blocks $n^2\ n^2$, having guide-lugs projecting into the slots. Through the lugs and stop-blocks shouldered hand-screws $n^3\ n^3$ pass from the rear, and have their shoulders bearing against washers which rest against the rear surfaces of the guide-bars. The stop-blocks $n^2\ n^2$ rest directly on the cross-bar $n'$, and said blocks may be adjusted and secured by means of the hand-screws to maintain the scarifier at any desired elevation. The scarifier is connected to the levers O O by suitable lifting-rods, $o$, fulcrumed to suitable supports. The operator's platform A' is supported at a proper elevation by being secured to hangers depending from the main frame in the rear of the oblique scraper and in front of the transverse scraper K. It will be observed that all of the operative levers and hand-stops of the scarifier are in convenient reach of the operator when on his platform.

The main frame A is provided in its rear portion with a floored apartment, $a\ a$, which is entirely out of the way of the operator's platform, and is adapted especially for carrying a heavy load and retaining it in its position by the deep sides that form it into a box, which is supported by the rear running-gear, and when said running-gear is set obliquely to change the angle of the scrapers to the line of draft of the front running-gear, as hereinafter more fully described, the said box-apartment is loaded with additional weight, which forces the sharpened tires into the earth, thus carrying the rear end of the machine to either side of the line of draft, and holding it firm in such position while doing the various work which this adjustment adapts the machine to perform—such as changing the angle of the scrapers, and thus lightening the draft, and adapting the main oblique scraper-bar to scour in soil that would clog before it; or, by reversing the adjustment of said rear running-gear, the point may be brought within the track of the front running-gear, and near to a direct line of the draft, when it is desired to plow earth that is very hard and refractory, or for any other purpose desired—such as setting the main oblique scraper more nearly square across the line of draft and making the transverse scraper take an angle in the opposite direction, and thus enabling the operator to carry the earth to either side of the machine at the same time. The main scraper can thus be made to move more or less earth ahead and widen or narrow the breadth of its cut. The position of the point of the main oblique scraper can also be made to cut on either side of the nearest front-wheel track, thus running to or from land, as in setting a common plow; or, by carrying the point inside of said wheel, the main-scraper blade will both plow and scrape at the same time and cut a ditch within the track of its carrying-wheels. By adjusting said rear running-gear to run toward the rear end of said main-scraper blade, in connection with the elevated frame that allows the front running-gear to turn around short and sweep the loaded scraper across the roadway, the entire load can be carried directly to one side of the line of draft in which it was advancing.

Having now described my machine's construction as regards the earth-scraping or cutting-away and scarifying devices, their supports, and operating mechanism, I will describe that portion of its structure which enables it to be operatively mounted upon the running-gear of an ordinary farm-wagon, with only such alterations as may be readily effected by any unskilled laborer.

To the opposite sides of the front end of the main frame are secured the two upwardly-projecting curved arms P P, which may be either of wrought or cast iron, and form what I term the "arched front frame." The arms converge forwardly, and have their front ends secured together and firmly attached to an iron ring, Q, which forms the upper portion of a double turning-circle. From the center of the ring Q a pin, U, which is to serve as king-bolt, projects downward, said pin being inserted in the cross-bar $u'$ of the ring. A spring-standard, W, supports the driver's seat W', and has its feet secured near the front end of said front frame. The corresponding portion of this double circle is attached to the front running-gear, R, in a manner to be more fully explained hereinafter. I do not wish to confine myself to this particular construction; but the arms of the front frame may not converge forwardly, or there may be substituted for them an elevated frame, or any suitable construction that can be attached in a substantial manner, that will give a broad support or bearing, and that will allow the front running-gear to turn freely, and at the same time prevent the frame from tipping sidewise, as in the case of the front bolster of a farm-wagon when resting on the sand-board, or partly at an angle thereto. Between the turning-circle and the front end of the main frame A the arms P are bent or arched upward to such a height that the attached forward running-gear may be turned short around and bring the wheels past a line drawn lengthwise through the center of the machine under the arched frame. It will be thus seen that the machine may be turned around until the team would come in contact with the side of the machine on either side, if desired. This is a feature of considerable importance in this class of machine, where it is frequently desired to be brought into use on narrow lanes or roadways, lawns, and walks; but its main features of novelty and value are in enabling the draft to be applied at any angle greater or less than ninety degrees from the line of direct forward draft, and thus enable the main oblique scraper to stop its load and carry or sweep it around at right angles (more or less) to the street or line of direction in which it may be operating, and in this manner enable the operator to deposit the load that may be in front of said scraper at the opposite side of the street or roadway, as in case of a deep rut on one side of the road that may require the load of earth collected from the opposite side, or a raised and elevated cross-walk in town or city streets, where it is required to carry the earth directly across the roadway and spread it against the side of said cross-walk, and to the opposite side of the street from which the load of earth has been collected, and at right angles to the roadway. There is still another novel feature in connection with this elevated turning frame of much importance in a hilly country, where, on going up the grade and plowing and scraping, it becomes desirable to throw the plow-point into the road-bed and sweep the load around across the roadway, and at the same time plow a diagonal cut, which requires the team to swing around well toward the side of the machine, and thus cut out and throw up a diagonal ridge or water-stop and turn the surface-water across the roadway to the lower side, thus plowing and scraping at the same time directly or diagonally across the roadway, as stated, which could not be accomplished if the frame were not constructed to allow turning freely to the angle required to accomplish this result, and in connection with an unyielding adjustable blade and plowing attachment that is adapted to do this work.

On the under side of the main frame is arranged a cross-bar, S, suitably secured to the frame. At its middle the cross-bar S is provided with a hole, and a segmental series of holes, $s^2$, on either side, and to this cross-bar S is to be secured the forward ends of the rear hounds, $r$. When the main frame A is mounted on the bolster of the rear running-gear, R, of a farm-wagon, as shown in Figs. 1 and 3, the series of holes in the cross-bar S are to permit the line of draft of the rear wheels and axle carrying the same to be inclined either to the right or left of the line of draft to the front running-gear, as explained heretofore, and prevent the load bearing against the rear end of the oblique scraper from crowding the machine around sidewise; and to accomplish the results heretofore referred to and explained the main frame sets loosely between the stakes of the rear bolster. I do not confine myself strictly to this mode of changing the rear axle, but any suitable means may be employed that secure the same results. The machine will run straight when the adjusting-bolt secures the said hounds in the center hole. There are other obvious advantages of this said adjustability of the rear running-gear, only one of which I will refer to—that is, by this adjustment being made toward the rear of the oblique blade, in connection with the turning of the front running-gear short around, as has been explained, in sweeping the load to the opposite side of the road, this adjustment will carry the rear end of the blade and its load much farther toward the other side than would be the case were the said rear running-gear left in line with the body of the machine.

To prepare the running-gear to receive the machine, all that is necessary is to remove the ordinary long reach. The rear running-gear is then ready. Next remove the front bolster and insert a short or stub reach in the front running-gear in the place of the long reach and secure it to the hounds rigidly. Then the lower portion, $q$, of the double turning-circle, corresponding with the upper portion, Q, already described as secured to the front frame, is to be secured to the front running-gear at any convenient points in a detachable manner. This circle and its accompanying devices for attachment to said running-gear are a part of said grading-machine, and belong with it, and not with the farm-wagon, except in its use for carrying a grading-machine. To said front running-gear I place two or more cross-pieces or supporting-blocks, resting on the hounds and stub-reach, if desired, and they may be detachably secured to said running-gear, but preferably to the stub-reach, and resting both on it and the hounds in front and behind the axle of said running-gear. These supports now being in place, we place the said lower circle on these supports and attach it removably in such a manner as to bring its center to coincide with the king-bolt hole of said running-gear, and also to rest on or above the sand-board. Said circle may have a tie-bar attached, which passes through its center, and provided with a hole to correspond with the king-bolt hole in said running-gear, through which holes the king-bolt, heretofore referred to, may be loosely inserted in such a manner as to allow either front wheel to play up or down to pass over the uneven surfaces of the earth, and not bind on said bolt. It will now be seen that by these circles being large the bearings of the upper or rigid one, which is on the main frame, will have a support so broad, relatively to the proportions of the main frame, the gage of the wheels, and the disposition of the load, that should a rear wheel drop into any depression it does not tip the main frame and tilt the ends of the scraper-bars up and down, as it instantly has support on that side of the broad ring which is between the king-bolt and the front wheel that is on the same side. In case a forward wheel likewise sinks into a depression, the broad bearing of the main frame on the rear bolster produces a like effect. Thus it is seen that the carrying-frame and scrapers are prevented from a rocking or tilting movement in passing over rough and uneven ground, and when the scraper-bars are locked rigidly, as in plowing and cutting into hard earth, the plow attachment is carried ahead into its work unyieldingly and forced to cut into the hard and high places, while the front sections of the cutting-blades cut and scrape away the hard earth not broken by the plowing attachment, and the same is true of the ends of any of the scrapers, and also of the scarifier. Thus the necessity of the special adjustable and changeable features referred to heretofore in accomplishing this and other work. It will be seen that the working parts can now be carried over or forced into the uneven earth, and still retain practically the same horizontal plane lengthwise of the scraping-blades and scarifier and of the leveled and smooth surface immediately in the rear of the machine. The attachments being secured, the machine can be at once hoisted upon the running-gear, with the king-bolt near the front end of the front frame passing down into the hole prepared to receive it in the front running-gear, and the double circles resting against each other in the usual manner. The front ends of the hind hounds are then bolted to the cross-bar S loosely by a bolt, which can be changed, when desired, to adjust the angle of said rear running-gear, and the machine is then ready for use. When there is no more use for the machine, it can be readily removed from said running-gear, which can then be restored to its original condition in a few moments and applied to the uses of a farm-wagon again.

In order to make my invention more effectual than it would otherwise be, I prefer to supply each machine with a set of auxiliary sharpened tires, which may be attached to the wheels outside of their own tire, or in any suitable manner. These tires are forced into the earth by the weight of the machine and the extra load provided for that purpose, when required, as in changing the angle of the scraper-bar or on sloping surfaces, and they also assist in holding the machine in place against the side pressure of the rear end of the oblique scraper when heavily loaded. Their peculiarity consists in their shape. The tire of the off or right-hand wheel, Z, is double bevel on its cutting or outer edge, as shown at $z$, to form a knife-edge, while the tire of the "nigh" or left-hand wheel has its outer surface beveled only on one side to form a chisel-edge, its bevel-face being turned inwardly. Both of the tires may be knife-shaped, or both chisel-shaped, if preferred; but I prefer one of each kind, in pairs, as shown. I may also substitute a wheel having a sharp edge for the shoe F', attached to the same or a similar framework, whereby it may be vertically adjusted.

Instead of using the lifting-bars $m^4\ m^4$ for the scarifier M and the guides supporting the scrapers, I may attach any or all of them to the front ends of rearwardly supporting arms $m^2$, the rear ends of which are pivoted to the sides of the main frame, as shown in Fig. 9; or these arms may be jointed at both ends, if desired, and placed in pairs attached one above the other near the upper and lower edges of the scrapers or scarifier, and a supporting-frame may depend from the main frame to carry and support their rear ends, if desired. With these modifications the lifting-levers will be connected with the scrapers or scarifier to adjust their ends vertically and independently, and any of the devices described or shown may be used to lock said lifting-levers in proper position up or down.

It will be understood that I do not confine myself to any particular angle of the oblique scraper or scarifier to the line of draft or main frame.

I would have it understood that I lay no claim in this application to the modified construction shown on page 9 of the drawings, and also described; nor to the described cutting-wheel to be used in place of the shoe for the same or a similar purpose, and its adjustable and supporting parts; nor to the described connection and use of the lever D with a pinion meshing into a toothed rack and connected to a scraper-bar or scarifier, and its described manner of changing the lever D in regard to adjusting it in a convenient position for the operator with these devices and the purposes stated. I hereby reserve the right to make features not specifically claimed in this application the subject-matter of another application.

The construction and various operations of my machine having been described and the functions of the various devices pointed out, the operation of the invention as a whole will be obvious.

I claim—

1. In a grading-machine, the combination of a carrying-frame adapted to turn freely on a front running-gear to any desired angle to the central line of draft, and a vertically-adjustable scraper-bar, with a rear running-gear adapted to be turned at an angle to the said central line of draft, and thus to change the angle and lateral position of said scraper-bar with respect to the direct line of draft, substantially as set forth.

2. In a grading-machine, the combination, with a supporting-frame carrying one or more scraper-bars, of a turning and supporting bearing adapted to be detachably secured to the front running-gear of an ordinary farm-wagon by the removal therefrom of the bolster and reach, substantially as set forth.

3. In a grading-machine, the combination, with the front running-gear of an ordinary farm-wagon, of a detachable device for connecting a grader with said running-gear, consisting, essentially, of the described bearing-circle and stub-reach, and supports for the forward and rear portions of the circle, these supports being removably mounted on the said running-gear, substantially as set forth.

4. In a grading-machine, the combination, with a supporting-frame, an oblique scraper, and curved arms attached to each side of the front end of the frame, and curving forward to form an arched front frame, of the front running-gear of an ordinary farm-wagon, and the described double turning-circle, to the upper portion of which the forward ends of the curved arms are rigidly secured, the curved arms and turning-circle being arranged and adapted to permit the running-gear to be turned freely, and to form a broad bearing for the grader-frame, which is thereby prevented from tipping under the influence of the oblique scraper, substantially as set forth.

5. In a grading-machine, the combination of a front running-gear, carrying-frame, and scraper-bar, having forward support on the axle of said running-gear, with a king-bolt free to move up and down in its socket, and the broad turning-bearings on either side of said king-bolt or other suitable devices, substantially as set forth.

6. In a grading-machine, the combination, with the main oblique scraper, of an auxiliary scraper having its front end independently adjustable, and operating on the opposite side of the central line of draft from the front end of the main oblique scraper, while its rear end is attached and adjustably pivoted to the main scraper, substantially as set forth.

7. In a grading-machine, the combination of a plowing attachment and scraper-blade with an elevated front frame, and front running-gear capable of running under said front frame, whereby the line of draft on said front running-gear may be brought to a right angle (more or less) to a line drawn lengthwise through said frame, in order to plow a gutter across the roadway, and, if desired, place the earth broken up directly or diagonally across the roadway to form a ridge for a water-stop, substantially as set forth.

8. In a grading-machine, the combination, with a supporting-frame carrying a scraper suspended between the front and rear axles, and means for vertically adjusting it and for locking it in any of its adjustments, of bearings associated with the supporting-frame and located before and behind the scraper, and running-gear on which said bearings rest, said bearings and running-gear being arranged and adapted to maintain the supporting-frame and scraper in a plane practically parallel with the general contour of the surface immediately behind the scraper, substantially as set forth.

9. In a grading-machine, the combination, with a supporting-frame having an oblique scraper-bar adapted to use in connection with a plowing attachment, and means to impart adjustment thereto and rigidly lock the same in such adjustment, of such plowing attachment and front carrying-wheels, forming a front running-gear, and a carrying-frame adapted to permit said wheels and frame to be turned to apply the draft at a right angle, or more than a right angle, to the direct line of draft, substantially as set forth.

10. In a grading-machine provided with a scarifier having its ends independently vertically adjustable, one or more supporting cross-bars and cutting-spades secured thereto in such a manner as to admit of said spades being independently vertically adjusted on said bars, substantially as set forth.

11. In a grading-machine, the combination, with the main frame and broad bearings in front and rear, as described, of a vertically-adjustable scraper-bar, its rear end extending beyond and outside of the path of the rear running-gear, and devices for adjusting and rigidly locking said scraper-bar to a firmly-held carrying-frame, so that a path for the rear running-gear may be leveled and the work of leveling and grading be done more smoothly and evenly, substantially as set forth.

12. In a grading-machine, a scarifier provided with a series of adjustable reversible interchangeable cutting-teeth removably attached to an independently vertically adjustable supporting-frame, substantially as set forth.

13. In a grading-machine, a scarifier and means to impart independent vertical adjustment to its ends, substantially as described.

14. In a grading-machine, the combination, with a scarifier and means for imparting independent vertical adjustment to its ends, of independently vertically adjustable scarifying-blades, substantially as set forth.

15. In a grading-machine, the combination, with a scraper carried by said machine, of a scarifier provided with devices for vertically adjusting either end thereof independently of the other, substantially as set forth.

16. In a grading-machine, the combination, with a scraper carried by said machine, of a vertically-adjustable scarifier supported between guide-bars in front of said scraper, and means for locking the same, substantially as set forth.

17. The scarifier provided with horizontal notched supporting-bars and a series of adjustable reversible spades, substantially as set forth.

18. In a scarifier, the combination, with the notched supporting cross-bar, of the spades, pointing forward and downward, and hook-bolts embracing said spades and inserted through said bar, substantially as set forth.

19. The combination, with a scarifier, of the slotted guide-bars, guides for said bars, stationary projections in front of the slots of said bars, and the stop-blocks arranged for adjustment by means of said slots and suitable holding-screws, substantially as described.

20. In a grading-machine, the combination, with one or more endwise unyielding scarifiers, of means for adjusting the same endwise, substantially as set forth.

21. In a grading-machine supported on two carrying-axles, the combination of a vertically-adjustable scarifier operated between said axles, with a carrying-frame whose supporting-sides, one or both, are arranged horizontally between the ends of said scarifier and the direct central line of draft of said machine, according to the endwise adjustment of said scarifier, substantially as set forth.

22. In a grading-machine, the combination of a scraping-blade with a scarifier adjustable endwise to adapt it to cut outside the line of track of its carrying-wheels, substantially as set forth.

23. In a grading-machine, the combination of a scarifier vertically adjustable at either or both ends with one or more scraping-blades, substantially as set forth.

24. In a grading-machine, the combination, with the main supporting-frame and scraper-bar, and means for adjusting the same vertically and endwise, of anti-friction devices mounted in a frame rigidly secured to the main frame, and arranged to relieve the friction resulting from direct resistance to the scraper-bar, substantially as set forth.

25. In a grading-machine, the combination, with one or more vertically-adjustable scrapers, of devices to prevent endwise yielding of said scraper and means for adjusting the same endwise, substantially as set forth.

26. In a grading-machine, the combination, with rods for vertically adjusting the scraper-bar, of one or more scrapers provided with means for endwise adjustment upon said rods, substantially as set forth.

27. The combination, with a main supporting-frame and a scraper of a grading-machine, of an angle-iron guide-rod attached to said scraper, guides for said rod supported by the frame, and a friction-wheel mounted on the frame, and having its periphery projecting into the concavity of said guide-rod, substantially as and for the purposes set forth.

28. In a grading-machine, the combination, with an elevated supporting-frame carrying one or more oblique scrapers attached to said frame in front of the rear carrying-axle, and means to impart independent vertical adjustment to its ends, and provided with locking devices to secure said scraper in such adjustments, of front running-gear adapted to be turned freely to apply the draft at about ninety degrees (more or less) to the direct central line of draft of said frame, substantially as set forth.

29. In a grading-machine, the combination of a plowing attachment and an oblique scraper-bar, independently vertically adjustable at its ends, with devices for changing the angle of said scraper-bar to the line of draft, to enable it to scour and run free in the various soils in which it may be used, substantially as set forth.

30. In a grading-machine, the combination of one or more plows with a series of removable cutting-blades attached to one or more scrapers vertically adjustable at either or both ends, and means for locking said parts in their adjusted positions, substantially as set forth.

31. In a grading-machine, the combination of one or more vertically-adjustable plowing attachments, adapted to be adjusted toward or from the central line of draft of said machine, with one or more scraper-blades and devices to prevent endwise and lateral yielding of said attachments, substantially as and for the purposes set forth.

32. In a grading-machine, the combination, with one or more scraper-bars, of one or more vertically-adjustable landsides, adapted also to be adjusted toward or from the central line of draft of said machine, and devices to secure it in such adjustments with respect to said central line of draft, substantially as and for the purposes set forth.

33. In a grading-machine carrying one or more scraper-blades, two or more plowing attachments independent of each other, adapted to operate on opposite sides of the central line of draft, either independently or at the same time, substantially as and for the purposes set forth.

34. In a grading-machine, the combination, with the main oblique scraper, of an auxiliary scraper located in front of the oblique scraper, and to the rear of its forward end, and arranged to collect and stop more or less earth, according to its position, the inner end of said auxiliary scraper being secured to the main oblique scraper, so that the said auxiliary scraper can be vertically adjusted independently of the main scraper, substantially as set forth.

35. In a grading-machine, the combination, with the main supporting-frame and a vertically-adjustable scraper-bar, and means for supporting the same against deflection from direct resistance, of guides attached to the main frame, and arranged to embrace said supporting devices, whereby said scraper-bar is held against forward endwise movement and horizontal vibratory movement, substantially as set forth.

36. In a grading-machine, the combination of a scraper with means for holding it from forward movement endwise and horizontal vibratory movement with respect to its supporting-frame, substantially as set forth.

37. In a grading-machine, the combination, with a scraper-bar, its carrying-frame, and devices for vertically adjusting it, of anti-friction devices which support it in the same vertical plane in its various positions, and bearings therewith which hold the scraper against forward endwise and horizontal vibratory movement, substantially as set forth.

38. In a grading-machine, the combination, with an oblique main-scraper bar, of an auxiliary scraper and plowing attachment arranged at an angle to the main-scraper bar, adjacent to and intermediate between its ends, and vertically adjustable independent of said main-scraper bar, substantially as set forth.

39. The combination, with an oblique scraper-bar supported upon a wheeled frame, of an auxiliary scraper at an angle thereto, and arranged adjacent to the front side of said oblique scraper, and operating at a point in front of the pivotal turning-point of said oblique scraper when turned by said machine, substantially as set forth.

40. In a grading-machine, the combination, with the main oblique scraper, of an auxiliary scraper adapted to stop more or less of the earth being acted upon by the main scraper, and having its ends vertically adjustable independently of each other, substantially as and for the purposes set forth.

41. The combination, with the main oblique scraper, of an adjustable earth-stop, one end of which is pivoted to the front face of said scraper, the other end being free, substantially as set forth.

42. In a grading-machine carrying an oblique scraper-bar, the combination of an earth-stop pivoted to said machine, and adapted to stop the earth being acted upon by said scraper-bar, and means of locking said stop above its pivotally-hinged point of attachment, substantially as set forth.

43. In a grading-machine, the combination, with an oblique scraper-bar and a carrying-frame, of an earth-stop located in front of said scraper-bar, and so arranged as to stop the earth which is being acted upon by said scraper-bar and carry it ahead, and means to elevate said stop above the upper edge of said scraper-bar, and means of adjusting and locking said stop between the lower edge of said scraper-bar and its upper edge, substantially as set forth.

44. In a grading-machine supported on running-gear, the combination of an oblique scraper, an earth-stop, and an adjustable rear axle, substantially as set forth.

45. The combination, with an oblique scraper-bar supported upon a wheeled frame, of an earth-stop arranged adjacent to said scraper-bar and wholly in advance of the rear axle, substantially as and for the purposes set forth.

46. In a grading-machine, the combination, with a main-scraper bar, of an earth-stop and means for holding it down into operative position by the action of the earth which presses against it, substantially as set forth.

47. In a grading-machine, the combination, with an oblique scraper supported on two axles, of an earth-stop in front of the rear axle adapted to stop the side movement of the earth being acted upon by said oblique scraper and carry it directly ahead, substantially as set forth.

48. In a grading-machine, the combination, with the main supporting-frame and scraper-bar and means for adjusting the same, of anti-friction devices arranged and adapted to relieve the friction resulting from lateral as well as direct resistance to said scraper-bar, substantially as set forth.

49. In a grading-machine, the combination, with the main supporting-frame and scraper-bar and rods for adjusting the same, of anti-friction devices associated with the adjusting-rods, said rods and devices being arranged and adapted to relieve the friction resulting from lateral as well as direct resistance to the scraper-bar, substantially as set forth.

50. In a grading-machine, the combination, with the main supporting-frame and scraper-bar and angle-iron rods for adjusting the same, of beveled anti-friction wheels mounted in rigid frames and fitting into the concavities of the rods, substantially as set forth.

51. In a grading-machine, the combination of an oblique scraper, an earth-stop, and front and rear running-gear supporting a carrying-frame, the latter being capable of turning freely to any desired angle on said front running-gear, and also of being set at an angle on said rear running-gear with respect to the central line of direct draft, substantially as set forth.

52. In a grading-machine, the combination of one or more oblique and vertically-adjustable scraping-bars and a scarifying-bar with anti-friction devices mounted in a fixed supporting-frame rigidly secured to the main frame, and arranged to relieve the friction resulting from the resistance of said bars while being adjusted, substantially as set forth.

53. In a grading-machine, the combination, with a supporting-frame of a scraper-bar and means to impart independent vertical adjustment to its ends, of a plow and a series of blades secured to said scraper-bar, and arranged to form a continuous linear cutting-edge, and adapted to be reversed edge for edge, substantially as set forth.

54. In a grading-machine, the combination, with a scraper-bar and means to impart independent vertical adjustment to its ends, of a plow and a series of blades secured to said scraper-bar, and arranged to form a continuous linear cutting-edge, and adapted to be interchangeable plate for plate, substantially as set forth.

55. In a grading-machine, the combination, with a supporting-frame of a scraper-bar and means to impart independent vertical adjustment to its ends, of a series of blades secured to said scraper-bar, and arranged to form a continuous linear cutting-edge, and adapted to be independently vertically adjusted, substantially as set forth.

56. In a grading-machine, the combination, with a scraper-bar, of a series of interchangeable and vertically-adjustable cutting-blades attached to said scraper-bar, and arranged to form a continuous linear cutting-edge, substantially as set forth.

57. In a grading-machine, the combination, with a scraper-bar, of a series of reversible and vertically-adjustable cutting-blades secured to said scraper-bar, and arranged to form a continuous linear cutting-edge, substantially as set forth.

58. In a grading-machine, the combination, with a scraper-bar whose ends are vertically adjustable independently of each other, of a series of cutting-blades reversible edge for edge and face for face on said scraper-bar, substantially as set forth.

59. In a grading-machine, the combination of a scraper-bar with a series of reversible, interchangeable, and vertically-adjustable cutting-blades, substantially as set forth.

60. In a grading-machine, the combination of a scraper-bar whose ends are vertically adjustable independently of each other with a series of cutting-blades that are reversible face for face on said scraper-bar, substantially as set forth.

61. In a grading-machine, the combination, with a scraper-bar, of a plow and a series of reversible and interchangeable cutting-blades, forming a substantially continuous and rectilinear cutting-edge, substantially as set forth.

62. In a grading-machine, the combination, with a scraper-bar and means to impart independent vertical adjustment of its ends, of friction-clutch devices associated with said adjusting devices, substantially as set forth.

63. The combination, with the lifting-lever, of the friction-clutch device, consisting, essentially, of the segments, the inclined lugs, the roller interposed between said segments and lugs, and means to move the roller simultaneously with the lever, substantially as set forth.

64. The combination, with the lifting-lever, of the friction-clutch device composed of the segments, inclined lugs, roller arranged between the segments and lugs, and mounted in movable bearings attached to a rod arranged along the lifting-lever in position to be grasped in the hand at the same time with said lever, substantially as and for the purpose set forth.

65. In a grading-machine, the combination, with a scraper and a rod for lifting the same, of the described friction-clutch attached to the said rod, and means to lock the scraper in any desired position, to prevent it and its adjusting-rod from being elevated and throwing down the clutch, substantially as set forth.

66. In a grading-machine having one or more vertically-adjustable oblique scraper-bars, the combination of an adjusting-lever and means of attaching it, at various distances from its fulcrum, to said scraper-bar, with a friction device for locking said lever in such adjustments, thereby varying the resisting strain on said clutch according to the condition of the soil being operated upon, and the varying strain and downward tendencies of said scraper-bar according to its endwise adjustment, substantially as set forth.

67. In a grading-machine carrying vertically-adjustable operative parts and devices constructed to afford a variable leverage to impart vertical adjustments to such parts, the combination therewith of means for supporting and locking such operative parts while the adjusting devices are being detached and attached in varying positions better adapted to operate and be operated upon, substantially as set forth.

68. In a grading-machine, the combination of a friction-clutch and devices for rigidly locking the same with the operative adjustable parts of said machine, substantially as set forth.

69. In a grading-machine, the combination, with the main oblique scraper and means to impart independent vertical adjustment to its ends, of a transverse scraper and means to impart independent vertical adjustment to its ends, substantially as set forth.

70. The combination, with a scraper adapted for oblique arrangement with respect to the line of draft in a grading-machine, and having its front end provided with a plow-point and a landside, of a pivoted guard-bar and shoe arranged relatively to said plow-point, substantially as set forth.

71. In a grading-machine, the combination, with a supporting-frame and an obliquely-arranged scraper attached thereto, of a dragging shoe arranged to enter the earth and brace the machine against lateral swerving, and provided with elevating devices independently of the scraper.

72. In a grading-machine supported on carrying-wheels, the combination of an oblique scraper with a pivoted dragging runner adapted to penetrate the surface being acted upon, and held in such contact by the weight of some portion of said machine, to prevent lateral swerving, substantially as set forth.

73. In a grading-machine, the combination of an oblique scraper with a laterally-adjustable guard-bar and dragging shoe, substantially as and for the purpose set forth.

74. In a grading-machine, the combination, with the main frame and rear running-gear, as described, of the cross-bar provided with a series of perforations, to admit of an adjustable connection with the hounds of said running-gear, substantially as set forth.

75. In a grading-machine supported on carrying axles and wheels, the combination of one or more plowing attachments with one or more vertically-adjustable oblique scraper-bars adapted to plow and scrape either out or in side the line of the tracks of said wheels, as desired, by adjusting the rear axle, substantially as set forth.

In testimony whereof I have signed this specification in the presence of two subscribing witnesses.

GEORGE H. WALDO.

Witnesses:
W. M. LISTER,
F. W. HAYES.